L. J. ATWOOD.
Cigar-Lamp.
No. 219,136.   Patented Sept. 2, 1879.
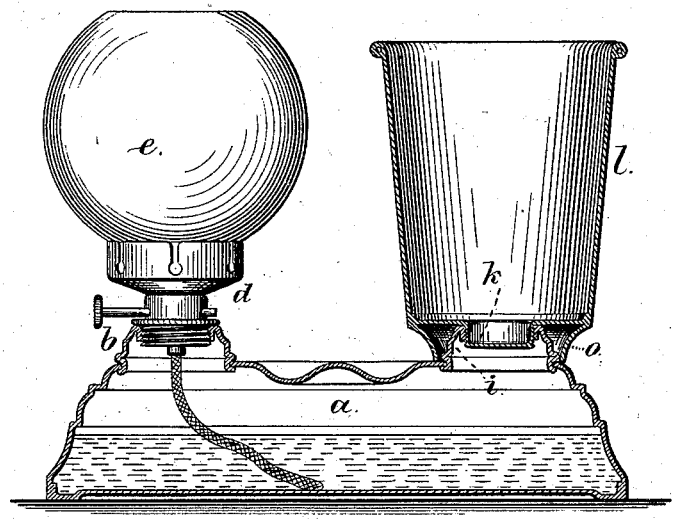
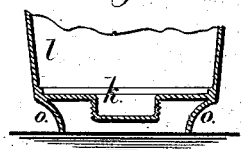
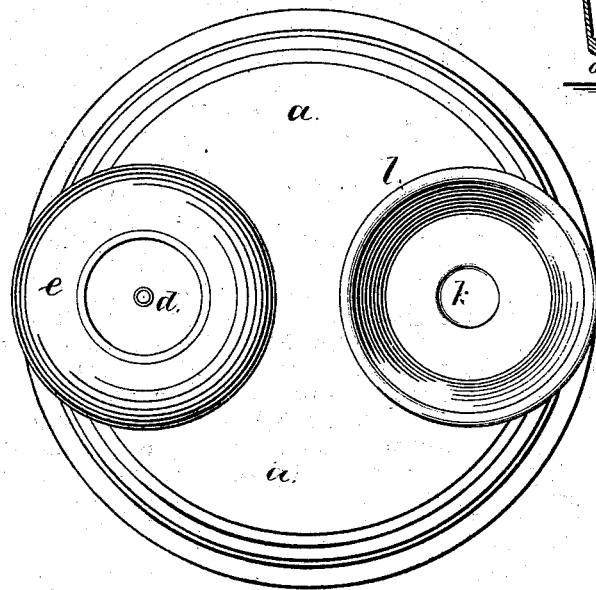
Witnesses
Chas. H. Smith
Geo. T. Pinckney
Inventor
Lewis J. Atwood.
per Lemuel W. Serrell
Atty

UNITED STATES PATENT OFFICE.

LEWIS J. ATWOOD, OF WATERBURY, CONNECTICUT, ASSIGNOR TO PLUME & ATWOOD MANUFACTURING COMPANY, OF SAME PLACE.

IMPROVEMENT IN CIGAR-LAMPS.

Specification forming part of Letters Patent No. 219,136, dated September 2, 1879; application filed July 21, 1879.

*To all whom it may concern:*

Be it known that I, LEWIS J. ATWOOD, of Waterbury, in the State of Connecticut, have invented an Improved Cigar-Lamp, of which the following is a specification.

Cigar-lamps have been made with a flat broad reservoir and a burner on one part of the top screwed into a neck, with a filling-tube at another part of the top having a screw-cap, and with a cup for holding lighters or cigars soldered fast to the reservoir in another part of the top. In this instance difficulty is experienced in emptying the cigar-ashes, burned matches, or other accumulations in the cup, because the entire reservoir has to be turned up in thus emptying the cup.

My invention is made for facilitating the removal of ashes, burned matches, and other refuse from the cup, so as to insure the same being emptied whenever the reservoir is filled or the lamp trimmed. To effect this object I combine with the filling-tube of the cigar-lamp a cover for the tube and the cup, connected together, so that the cup will be removed from the lamp in the act of opening the filling-tube. Thereby the cup will become detached, and can be emptied of the cigar-ashes, burned matches, and similar material with the greatest facility.

In the drawings, Figure 1 is a vertical section of the lamp and cup. Fig. 2 is a plan of the same, and Fig. 3 is a detached section of the bottom of the cup.

The reservoir $a$ is preferably broad and circular, and $b$ is the screw-collar thereof, to which the burner $d$ is attached. This burner may be of any desired character. I have shown the same as provided with a globe, $e$.

The filling-tube $i$ is made with a cover, $k$, and to this cover the cup $l$ is attached. The cup is adapted to hold cigars, lighters, or matches, and will usually also receive cigar-ashes and burned matches.

The cover $k$, preferably, will screw upon the filling-tube $i$, as shown, and the flanged portion of the screw forms the bottom of the cup, and the sides of the cup are contracted at $o$ sufficiently to surround the filling-tube or collar, as shown, and when the cup is removed these portions $o$ form a base for the cup to stand on. I do not, however, limit myself in these particulars, but intend to employ a plug or slide to form the cover to the filling-tube, the same being fastened to the cup, and removable with the same from the reservoir.

I claim as my invention—

1. The combination, with the burner and reservoir in a cigar-lamp, of a cup and filling-tube cover, connected together and removable from the filling-tube, substantially as set forth.

2. The screw-cap to the lamp-reservoir, formed with a broad flange, and composing the bottom of the cup, in combination with said cup, the bottom portion of which is contracted, so as to surround the filling-tube or collar, substantially as set forth.

Signed by me this 16th day of July, 1879.

L. J. ATWOOD.

Witnesses:
R. T. LATTIN,
J. L. ATWOOD.